Aug. 2, 1955
C. I. BLAIR
2,714,465
COLLAPSIBLE PAN
Filed July 23, 1953
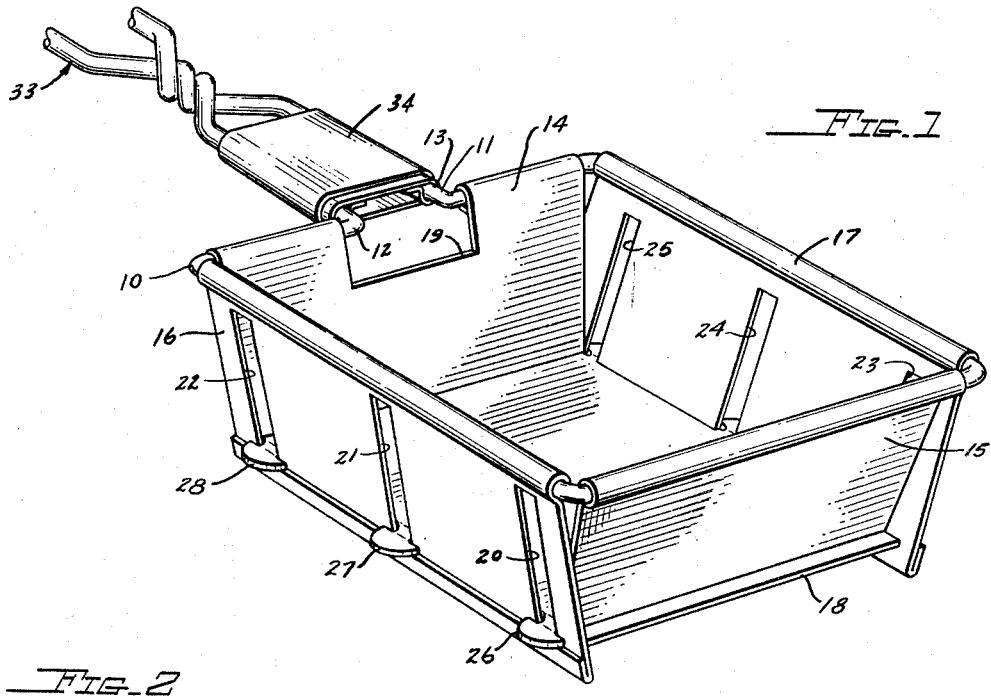
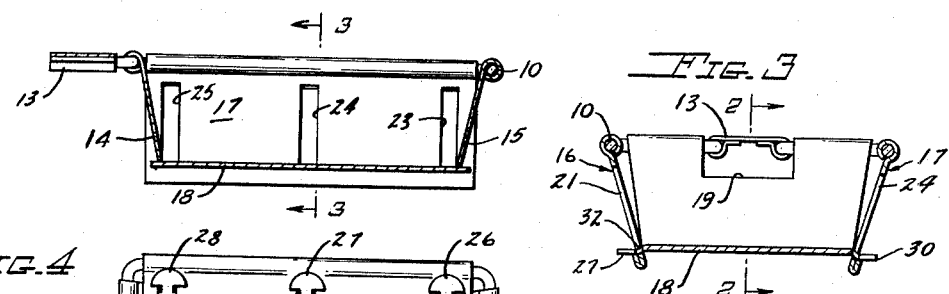
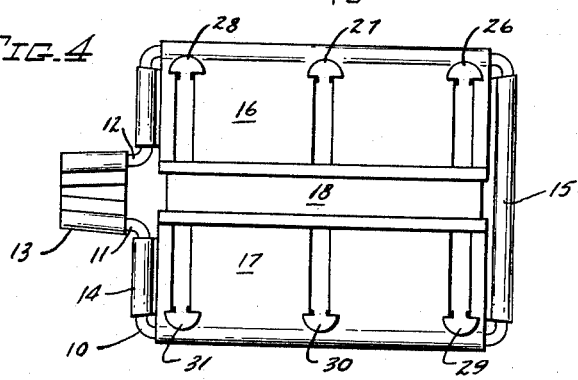
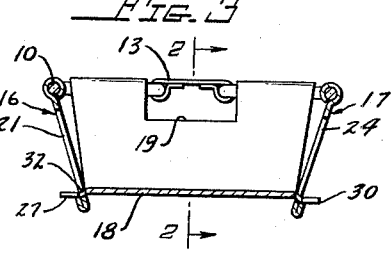
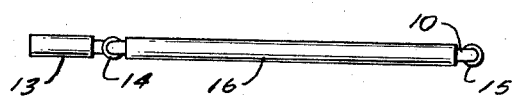
CLARENCE I. BLAIR
INVENTOR
BY *Hubert Miller*

United States Patent Office 2,714,465
Patented Aug. 2, 1955

2,714,465

COLLAPSIBLE PAN

Clarence I. Blair, Wichita, Kans.

Application July 23, 1953, Serial No. 369,864

4 Claims. (Cl. 220—6)

This invention relates generally to cooking pans, and the principal object of the invention is to provide a pan which is capable of being collapsed or folded flat for easy storage in a camp kit, as well as to facilitate its commercial shipment from the manufacturer to the wholesaler and retailer.

An additional object is to provide a pan which is adapted to be lined with metal foil prior to use, thus eliminating the necessity of cleaning it after each use.

The invention, together with other objects attending its production, will be more clearly understood when the following description is read in connection with the accompanying drawing, in which:

Fig. 1 is a perspective view of a pan embodying the invention;

Fig. 2 is a central longitudinal sectional view of the pan, with the handle removed;

Fig. 3 is a central transverse sectional view, as indicated by the line 3—3 of Fig. 2;

Fig. 4 is a bottom plan view of the pan in a collapsed or folded condition, the handle being omitted for clarity, the dotted lines indicating the positions of the sides when folded; and Fig. 5 is a side view of the pan in its collapsed condition, with handle removed.

Referring to Fig. 1, it will be seen that the invention includes a one piece loop type supporting frame 10 of heavy wire bent to the desired shape and size to form the top edge of the pan. The two ends 11 and 12 of the frame are bent outward in parallel spaced relation at one end of the pan to form a stub handle. These ends 11 and 12 are secured in such spaced relation by means of a sheet metal strip 13 bridging the space between them, and having its oppoiste ends tightly rolled or crimped around the frame ends, as clearly shown in Figs. 3 and 4.

The pan includes oppositely positioned end plates 14 and 15, oppositely positioned side plates 16 and 17, and a bottom 18.

All four of the plates 14 to 17 inclusive have their upper edges rolled loosely over the adjacent portions of the frame 10, the frame thus serving as a pivot axis for the respective plates. Plate 14 has its upper edge cut away centrally, as at 19, to avoid interference from the frame ends 11 and 12, during pivotal movement of the plate.

It will be noted that the plates 16 and 17 are each provided with a plurality of similarly positioned upright parallel slots 20, 21, 22 and 23, 24, 25, extending from points near the lower edges of the respective plates to points near their upper edges. The respective lower edges of these two plates are preferably beaded or reversely bent, as shown, to increase strength.

The opposite ends of bottom plate 18 are cut away to form a similar plurality of similarly spaced projections 26, 27, 28 and 29, 30, 31, which have enlarged heads, and necks which are slightly less in width than the width of the slots, as clearly shown in Fig. 4. By twisting the heads of these projections slightly they may be inserted through the respective slots and straightened, thus slidably securing the opposite ends of the bottom plate 18 to the respective side plates 16 and 17. The necks of these projections are also provided with an offset bend, as clearly indicated by the numeral 32 in Fig. 3, to facilitate the nesting of the side plates flat against the bottom plate when the pan is collapsed.

The end plates 14 and 15 have downwardly converging side edges, as shown in Fig. 3, and are slightly less in width than the spacing between the plates 16 and 17. The distance from the upper edges of plates 14 and 15 to their lower edges, however, is slightly greater than the distance from the upper edges of plates 16 and 17 to the bottom plate 18 when the bottom is in the position shown in Figs. 1, 2, and 3. The bottom plate thus limits the outward movement of the lower edges of the end plates 14 and 15.

A removable handle 33, of twisted wire or other suitable material, is provided. At one end the handle has a socket 34, preferably of sheet metal, which is of a size and shape to complementally and snugly receive and grip the major portion of the stub handle 13.

*Operation and use*

With the structure described, it is evident that by manually pushing the lower edges of plates 14 and 15 inward until they lie in a common horizontal plane, the rest of the plates may also be moved to a position flat against plates 14 and 15. This is done by pushing the bottom plate 18 upward, in Fig. 2, and by then pivoting the plates 16 and 17 about the frame until they both lie flat against the bottom surface of the bottom plate. In actual practice it is only necessary to turn the entire pan over from the position shown in Fig. 1, and the force of gravity alone will cause the plates to assume positions flat against each other, as clearly shown in Fig. 5. By again rotating the handle 180°, all the plates will again assume the relative positions shown in Fig. 1, due to the force of gravity alone.

With the various plates in their Fig. 1 positions, the inside of the pan may be easily and quickly lined with a sheet of any commercially available metal foil (not shown), thus making the pan liquid tight. The edges of the sheet are preferably deformed around the upper edges of the pan proper to firmly anchor the lining. If desired, a cover for the pan may be made from the same foil. Food may thus be cooked as in any ordinary pan. The foil may then be easily removed and disposed of, and the pan folded and stored until subsequently needed. Washing of the pan proper is thus eliminated.

Having described the invention with sufficient clarity to enable those familiar with this art to construct and use it, I claim:

1. A receptacle comprising: a rigid substantially rectangular planar frame; two oppositely positioned side walls; means pivotally connecting the respective upper edges of said side walls to respective opposite sides of said frame; a bottom normally spanning the space between the lower edges of said side walls; a plurality of laterally spaced parallel upright apertures in each of said side walls extending from points near their respective upper edges to points near their lower edges; and identically spaced projections along the opposite side edges of said bottom and extending through and slidably secured in respective ones of said apertures; a pair of oppositely disposed end walls; and means pivotally connecting the respective upper edges of said end walls to respective opposite ends of said frame.

2. The pan described in claim 1, in which an end of said frame includes a rigid outward projection from which the entire receptacle may be supported, as by a handle.

3. A collapsible cooking pan comprising: a rigid substantially rectangular planar frame having a handle; separate oppositely positioned side and end walls each having its upper edge independently and pivotally secured to said frame; and a bottom having integral spaced projections along two opposite edges, said projections extending slidably through identically spaced vertical slots in two opposed walls of the pan, whereby the bottom is normally suspended therefrom in spaced relation to said frame, and may be moved to a position flat alongside said frame, with the bottom suspending walls juxtaposed in substantially parallel closely adjacent planes.

4. A receptacle comprising: a substantially rectangular rigid wire top frame; two oppositely positioned side walls having at least a portion of their respective upper edges wrapped around respective opposite sides of said frame forming pivotal connections therebetween; a bottom normally spanning the space between the lower margins of said side walls; a plurality of parallel upright elongated apertures in each of said side walls; a like plurality of integral projections carried by the opposite side edges of said bottom and slidably projecting into respective ones of said apertures, affording slidable movement of said bottom toward and away from said frame, and affording support for said bottom by said side walls; and a pair of oppositely disposed end walls having at least a portion of their respective upper edges wrapped around portions of the opposite ends of said frame forming pivotal connections therebetween.

References Cited in the file of this patent

UNITED STATES PATENTS

| | | |
|---|---|---|
| 1,171,924 | Brown | Feb. 15, 1916 |
| 1,265,627 | Dickey | May 7, 1918 |
| 2,539,260 | McCurdy | Jan. 23, 1948 |

FOREIGN PATENTS

| | | |
|---|---|---|
| 503,272 | Great Britain | Apr. 4, 1939 |